United States Patent Office 3,179,806
Patented Apr. 20, 1965

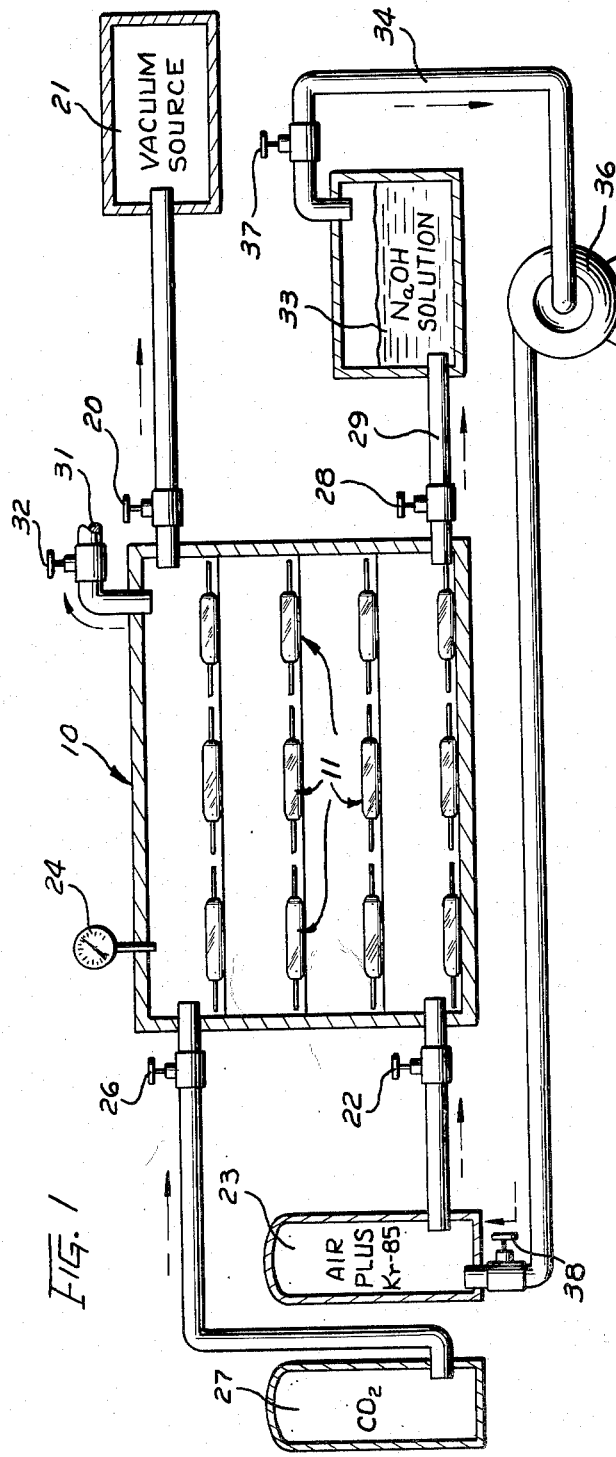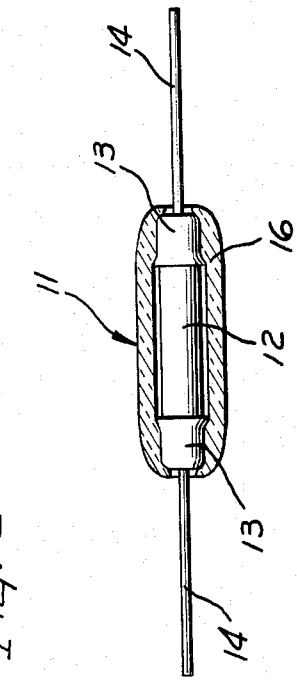

3,179,806
PROCESS FOR DETECTING A LEAK IN A GAS-FILLED ARTICLE
Alfred L. Dixon, Western Springs, and Stephen F. Skala, Glen Ellyn, Ill., and Joe C. Tribble, Winston-Salem, N.C., assignors to Western Electric Company, Incorporated, a corporation of New York
Filed Apr. 6, 1961, Ser. No. 101,171
5 Claims. (Cl. 250—106)

The present invention relates generally to processes for detecting leaks in gas-filled articles, and more particularly to improvements in processes for detecting such leaks using a radioactive tracer gas which is forced into leaky articles. Accordingly, the general objects of the invention are to provide new and improved processes of such character.

A prior-known process for detecting leaks in gas-filled articles includes the following steps:
(1) placing the article in a testing chamber;
(2) evacuating the chamber, so that gas escapes from within a leaky article and the pressure within such article drops;
(3) forcing a testing gas containing a radioactive tracer gas into the chamber, so that the tracer gas penetrates a leaky article;
(4) evacuating the chamber very quickly to remove the testing gas from the chamber, but so that some of the tracer gas ordinarily remains in a leaky article; and
(5) admitting air into the chamber to atmospheric pressure followed by flushing with air to remove surface contamination.

After these steps have been performed, the article is removed from the chamber and is examined for penetrating radiation emanating from within the article with a conventional radiation detector to determine whether the article leaked during the test.

Another object of the invention is to provide improvements in the prior process just described so as to render the process more amenable to the task of detecting relatively large leaks in the article under test. When a relatively large leak is present, using the prior process, the testing gas may escape from the article as fast at it escapes from the chamber during step (4) of the process.

Still another object of the invention is to provide improvements in the prior process which facilitate recovery and recycle of the radioactive tracer gas.

With the foregoing and other objects in view, an improved process illustrating certain features of the invention is characterized in that, after step (3) of the prior process as described hereinbefore, and without lowering the pressure significantly below atmospheric pressure, the chamber is flushed with an inert gas to remove the tracer gas from the chamber. Step (4) of the prior process is eliminated entirely.

Preferably, the inert gas used for flushing the chamber is carbon dioxide, and the tracer gas is separated from the carbon dioxide by bubbling the mixture through a solution of sodium hydroxide to permit recycle of the tracer gas.

Other objects, advantages and aspects of the invention will appear from the following detailed description of a specific embodiment thereof, when read in conjunction with the appended drawings, in which:

FIG. 1 is a generally schematic representation of a simplified form of equipment used in carrying out the improved process; and FIG. 2 is a central vertical section of a hermetically sealed deposited carbon resistor which may be tested for leaks in accordance with the invention.

Referring now in detail to the drawings and in particular to FIG. 1, there is illustrated a testing chamber 10 within which is placed one or more gas-filled articles which are supposed to be hermetically sealed and which are to be tested for leaks. One particular type of article to be tested is a hermetically sealed deposited carbon resistor which is designated generally by the numeral 11 and is illustrated particularly in FIG. 2.

Each resistor 11 comprises a cylindrical body 12 consisting of a layer of deposited carbon on a ceramic core, a pair of conductive end caps 13—13 at either end of the resistor body, and a pair of axial lead wires 14—14 which are welded to the end caps 13—13 to allow connection of the resistor in electrical circuits. The resistor body 12 is encased within a cylindrical glass housing 16, as illustrated, to provide what is designed to be a hermetically sealed assembly 11. The space between the resistor body 12 and the housing 16 is simply air at atmospheric pressure; however, the subject testing process is equally applicable to any article filled with substantially any gas at either subatmospheric, atmospheric or superatmospheric pressure.

According to both the present process and the prior process, the articles are placed in the chamber 10 through any convenient opening or door (not shown) and the chamber is then evacuated by opening a valve 20 which connects the chamber 10 to a vacuum source 21 of any suitable type. During this evacuation step, gas escapes from any leaky article and the pressure within such article drops to a pressure approaching the minimum pressure within the chamber 10. The minimum pressure during the evacuation step is not particularly critical, but should be well below that normally within the article. Where the initial pressure within the article is atmospheric, the minimum pressure during the evacuation step is preferably between approximately 0.1 and 10 millimeters of mercury for most applications, conveniently about 1 millimeter of mercury. The time of the evacuation step may vary from a fraction of a second up to about 10 minutes, depending on such factors as the size of the chamber, the vacuum applied, and the minimum size of leak which it is desired to detect.

After the evacuation step, a testing gas containing a radioactive tracer gas is then forced into the chamber to a pressure which is at least equal to and is preferably somewhat above the original pressure within the article being tested. Conveniently, the testing gas is a mixture of an inert carrier gas, such as air, containing a radioactive tracer gas, preferably one such as krypton-85 which emits gamma rays. Another tracer gas which is highly suitable for use in the process is a radioactive methyl iodide $CH_3I^{131}$.

With the apparatus illustrated in FIG. 1, the testing gas is admitted to the chamber 10 by closing the valve 20 and opening a valve 22 which connects the chamber 10 to a container 23 of the testing gas under suitable pressure. The pressure within the chamber may be governed by adjusting the various control valves in accordance with the reading on a gage 24 of any conventional design.

In the case of the deposited carbon resistors 11—11 described hereinbefore, the testing gas need only be admitted until atmospheric pressure has been reached, since the original pressure within the article was atmospheric pressure; however, it is preferred to force in the testing gas to a slightly elevated pressure, which assures the entry of the testing gas into articles containing only small leaks. If the pressure in this step were less than the original pressure within the article, the testing gas might not penetrate minute leaks in the article. The testing gas is allowed to remain within the chamber at the indicated pressure for a time long enough to insure penetration of all leaky articles to be detected. This time is not considered particularly critical, and the optimum time may be established empirically for any given application.

After the foregoing step of subjecting the article to the testing gas under pressure has been completed, the present invention differs significantly from the prior process in that, according to the present invention, the chamber 10 is next flushed with an inert gas, by which is meant one which is "inert" with respect to the tracer gas and preferably one which can readily be separated from the tracer gas. The pressure during the flushing step is equal to or slightly above atmospheric pressure, up to the maximum pressure during the preceding step.

Preferably, the flushing gas is carbon dioxide and is supplied to the chamber 10 by closing the valve 22 and opening a valve 26 which connects the chamber 10 to a container 27 of carbon dioxide gas under pressure. A discharge valve 28 is also opened which allows for the exit of the flushing gas through a discharge line 29.

The carbon dioxide gas is allowed to sweep through the chamber 10 until the tracer gas has been substantially completely exhausted from the chamber 10 and a neutral atmosphere has been provided therewithin, thus removing any surface contamination of tracer gas on the outer surfaces of the article. Any radioactive gas which has penetrated a leaky article may not escape therefrom in substantial quantity, because the pressure has not been reduced significantly, and is retained within the article during the flushing step.

After the flushing step, the valves 26 and 28 are closed, and the chamber 10 is vented through a discharge line 31 by opening a valve 32. The chamber 10 is then opened and the articles are removed therefrom. As soon thereafter as is convenient, the articles are examined for radioactivity, preferably gamma activity, therewithin to determine leakage during the test. Any convenient radiation detecting equipment, such as a scintillation detector, may be used, and the test may be either qualitative to determine whether or not the article leaked or quantitative to determine the approximate magnitude of the leak. These tests may be performed quickly by semi-skilled personnel.

The most significant result achieved by the present method is that the second vacuum-applying step of the prior process has been eliminated entirely and has been replaced by the simple step of flushing with an inert gas without intermediate lowering of the pressure below atmospheric. When this is done, it is insured that an appreciable and detectable quantity of the radioactive tracer gas which has penetrated any article under test will remain within that article prior to the detecting step. In this manner, large leaks in the articles may be detected on an appropriate scale, and a more accurate quantitative determination may be made in all cases.

It is preferred to separate the tracer gas from the inert gas used in the flushing step and to recycle the tracer gas for further use. For this purpose, the discharge line 29 is arranged, as illustrated in FIG. 1, to bubble the mixture of carbon dioxide, air and krypton-85 resultant from the flushing step through a sodium hydroxide solution 33.

The carbon dioxide combines with the sodium hydroxide to form sodium carbonate, which is retained in solution, whereas the air and krypton-85 pass through without effect. The stripped testing gas consisting of air and krypton-85 in approximately the original proportion is recycled from the sodium hydroxide solution 33 to the tank 23 through a return line 34, a blower 36, and valves 37 and 38.

While one specific embodiment of the invention has been described in detail hereinabove, it will be obvious that various modifications may be made from the specific details described without departing from the spirit and scope of the invention.

What is claimed is:

1. A process for detecting a leak in a gas-filled article, which comprises the steps of: placing the article in a testing chamber; evacuating the chamber to a reduced pressure substantially below the initial pressure of the gas within the article, so that gas escapes from a leaky article and the pressure within such article drops; forcing a radioactive tracer gas into the chamber to an increased pressure substantially above the reduced pressure so that the tracer gas penetrates such leaky article; removing the tracer gas by flushing the chamber with an inert gas without lowering the pressure significantly below the increased pressure, whereby the tracer gas is removed from the chamber and the surfaces of the article are decontaminated without also removing the tracer gas from within leaky articles; removing the article from the chamber; and examining the article for radioactivity therewithin to determine whether it leaked during the test.

2. The process as recited in claim 1, wherein the inert gas used in the flushing step is readily separable from the tracer gas to permit recycle of the tracer gas.

3. The process as recited in claim 2, wherein the inert gas used for flushing the chamber is carbon dioxide.

4. The process as recited in claim 3, wherein the radioactive tracer gas is one which is not absorbed by a sodium hydroxide solution, and wherein the tracer gas is separated from the carbon dioxide by bubbling the mixture through a solution of sodium hydroxide.

5. The process for detecting leaks in an article which contains a gas therein at atmospheric pressure and is supposed to be hermetically sealed, which comprises the steps of placing the article in a testing chamber, evacuating the chamber so that gas escapes from a leaky article and the pressure within such article drops, forcing a testing gas consisting of a mixture of krypton-85 and air into the chamber to at least atmospheric pressure so that the krypton-85 penetrates a leaky article, flushing the chamber with carbon dioxide at atmospheric pressure without intermediate lowering of the pressure below atmospheric, bubbling the mixture of the testing gas and carbon dioxide through a sodium hydroxide solution to strip the carbon dioxide from the mixture so that the testing gas may be recycled, venting the chamber to the atmosphere, removing the article from the chamber, and examining the same for radioactivity therewithin to determine whether it leaked during the test.

References Cited by the Examiner
UNITED STATES PATENTS

| | | | |
|---|---|---|---|
| 2,547,874 | 4/51 | Klema | 250—83.6 |
| 2,844,735 | 7/58 | Creutz et al. | 250—106 |
| 2,946,891 | 7/60 | Wesolowski | 250—106 |
| 2,999,162 | 9/61 | Fearon | 250—106 |

OTHER REFERENCES

Linder Abstract, application Serial No. 90,331, published February 25, 1951, 643 O.G. 1333.

Arthur Abstract, application Serial No. 206,829, published February 26, 1952, 655 O.G. 1177.

RALPH G. NILSON, *Primary Examiner.*

ARTHUR GAUSS, *Examiner.*